United States Patent

Murschall et al.

[11] Patent Number: 5,302,427
[45] Date of Patent: Apr. 12, 1994

[54] PRINTABLE, BIAXIALLY ORIENTED POLYOLEFIN MULTILAYER FILM

[75] Inventors: Ursula Murschall, Nierstein; Angela Speith, Wiesbaden; Herbert Peiffer, Mainz-Finthen, all of Fed. Rep. of Germany

[73] Assignee: Hoechst Aktiengesellschaft, Frankfurt am Main, Fed. Rep. of Germany

[21] Appl. No.: 772,839

[22] Filed: Oct. 8, 1991

[30] Foreign Application Priority Data

Oct. 8, 1990 [DE] Fed. Rep. of Germany ....... 4031784

[51] Int. Cl.⁵ ................................................ B32B 5/16
[52] U.S. Cl. .................................. 428/34.2; 428/323;
428/331; 428/349; 428/447; 428/354; 428/516;
525/387
[58] Field of Search ............ 428/349, 354, 516, 34.2,
428/331, 323; 525/387

[56] References Cited

U.S. PATENT DOCUMENTS

| 4,293,608 | 10/1981 | Isaka et al. | 428/220 |
| 4,348,457 | 9/1982 | Rosenthal et al. | 428/349 |
| 4,502,263 | 3/1985 | Crass et al. | 53/396 |
| 4,552,930 | 11/1985 | Hirota et al. | 525/333.8 |
| 4,692,379 | 9/1987 | Keung et al. | 428/349 |
| 4,734,317 | 3/1988 | Bothe et al. | 428/215 |

FOREIGN PATENT DOCUMENTS 0298730 1/1989 European Pat. Off. .
1145199 3/1969 United Kingdom .

Primary Examiner—Edith Buffalow
Attorney, Agent, or Firm—Foley & Lardner

[57] ABSTRACT

A printable, biaxially oriented polyolefin multilayer film which is low-temperature sealing on both sides and comprises a base layer and at least one sealing layer on each side of the base layer, the base layer containing a peroxide-degraded propylene homopolymer and each sealing layer containing an ethylene/propylene/butylene terpolymer and a propylene/butylene copolymer, one outer sealing layer containing a polydiorganosiloxane and silicon dioxide particles and not being corona-treated and the polydiorganosiloxane being added in the form of a masterbatch during the film production, results in a multilayer film especially useful as a packaging film.

26 Claims, No Drawings

PRINTABLE, BIAXIALLY ORIENTED POLYOLEFIN MULTILAYER FILM

BACKGROUND OF THE INVENTION

The invention relates to a printable, transparent, co-extruded polyolefin multilayer film which is low-temperature sealing on both sides. The multilayer film is distinguished by low film turbidity, increased scratch resistance, high surface gloss, printability, low sealing initiation temperatures (low-temperature sealing) on both sides, good slip properties, and universal usability on high-speed packaging machines. The invention also relates to a process for the production of the film and its use.

DE-A-16 94 694 discloses laminated materials which are sealable at high temperatures and comprise an oriented polypropylene film which contains at least one high-temperature sealable layer of an ethylene/propylene copolymer comprised of 2 to 6% by weight of ethylene and 98 to 94% by weight of propylene. These films have good high-temperature sealability, but they are not clear and scratch-resistant to the desired degree and, moreover, have inadequate processing characteristics on high-speed packaging machines.

EP-B-027,586 discloses sealable polypropylene films which have a sealing layer comprised of an ethylene homopolymer or copolymer, a long-chain aliphatic amine, an incompatible thermoplastic component, and a polydialkylsiloxane. These films represent an improvement over the films of DE-A-16 94 694, but they still do not run reliably on horizontal molding/filling/sealing machines.

DE-A-29 41 140 discloses a packaging material which is comprised of a base layer of a polypropylene polymer and of a surface layer which comprises a mixture of a propylene/ethylene copolymer and a $(C_4-C_{10})$-$\alpha$-olefin/propylene copolymer. This surface layer can also contain a thermoplastic resin of low molecular weight, as well as silicone oils. A disadvantage of packaging materials of this type is that they are susceptible to scratching and have unsatisfactory optical characteristics.

EP 114,312 discloses a transparent polyolefin multilayer film, which is comprised of a base layer of a propylene polymer and at least one sealable layer. The sealable layer comprises an olefin resin composition, an ethylene/propylene/butylene polymer and a propylene/butylene polymer and contains 5–15% by weight of a compatible hydrocarbon resin, 5–15% by weight of propylene homopolymer and 0.3–1.5% by weight of polydiorganosiloxane. The film has a low sealing initiation temperature and runs reliably on high-speed packaging machines. However, the film is not printable. Moreover, because of the addition of resin, resin deposits are formed on the longitudinal drawing rollers during film production and this has an adverse effect on the optical characteristics of the film caused by striation. When Example 1 of EP 114,312 was repeated, it was also found that the film had deficiencies in frictional characteristics and poor optical characteristics including high turbidity and low gloss. Moreover, flow defects arise over the film width, which lead to a high rejection rate.

Furthermore, in their brochure TAFMER XR, Japan 82 03 1000 Cl, Mitsui Petrochemical Industries Ltd. describe an $\alpha$-olefin copolymer which is suitable as a sealing layer for polypropylene films. However, as Comparison Example 8 of this application shows (see Table 1), polypropylene films provided with this sealing layer are not satisfactory in various respects.

None of the known multilayer films simultaneously meets the criteria which are important for a packaging film, i.e., low sealing temperature on both sides in combination with the following characteristics: printability, high surface gloss, low turbidity, homogeneous film optical characteristics (no striations, no flow defects), low susceptibility to scratching, good frictional characteristics and good running characteristics on high-speed packaging machines of various types.

SUMMARY OF THE INVENTION

Accordingly, it is an object of the present invention to provide a transparent polyolefin multilayer film which is intended to have a low sealing temperature on both sides in combination with printability, high surface gloss, low turbidity, homogeneous film optical characteristics, low friction and low susceptibility to scratching and which can be produced on conventional biaxial stretching units using roller stretching, and is intended to be particularly outstanding as packaging film having good processability on high-speed packaging machines of various types.

It is further an object of the invention to provide a method of producing the above multilayer film. In accordance with one aspect of the invention, there has been provided a multilayer film comprising:

a) a base layer comprising a peroxide-degraded propylene homopolymer, and b) at least one outer sealing layer on each side of the base layer, each sealing layer comprising a mixture of a first polymer comprising an ethylene/propylene/butylene terpolymer, and a second polymer, different from said first polymer, comprising a propylene/butylene copolymer, wherein at least one of said sealing layers is not corona-treated and comprises a polydiorganosiloxane and silicon dioxide particles.

In accordance with another aspect of the present invention, there has been provided a method of producing the multilayer film defined above, comprising the steps of:

i) forming melts comprising the individual components of said base and sealing layers, ii) co-extruding said melts corresponding to the individual layers of the film through a sheet die so as to form a multilayer film, iii) cooling said multilayer film so as to solidify it, iv) biaxially stretching said multilayer film, and v) heat setting said biaxially stretched multilayer film.

In a preferred method, the melt of the layer comprising the polydiorganosiloxane is formed by the use of a masterbatch process, which comprises the steps of:

A) forming a masterbatch comprising the polydiorganosiloxane and a portion of the polyolefin mixture which will be in the layer, and B) mixing said masterbatch with the remaining portion of said polyolefin mixture.

Further objects, features and advantages of the present invention will become apparent from the detailed description of preferred embodiments that follows.

DETAILED DESCRIPTION OF THE PREFERRED EMBODIMENTS

The multilayer film according to the invention comprises a base layer comprising a propylene homopolymer which preferably has been degraded by means of peroxide to a degradation factor A in the range of about 3 to about 10, and a sealing layer on either side of the base layer comprising an olefin resin composition, comprised of an admixture of an ethylene/propylene/butylene terpolymer and a propylene/butylene copolymer, wherein the terpolymer/copolymer mixture preferably comprises about 0.1 to about 7% by weight of ethylene, about 53 to about 89.9% by weight of propylene and about 10 to about 40% by weight of butylene, the percentages based on the total weight of said copolymer and said terpolymer. The term "copolymer" indicates, that the polymer is composed of two different monomers, accordingly the term "terpolymer" indicates that the polymer is composed of three different monomers.

One sealing layer is not corona-treated and preferably comprises about 1.0 to about 4.0% by weight, most preferably about 1.5 to about 3.0% by weight, based on the weight of the sealing layer, of polydialkylsiloxane having a preferred viscosity of more than about 50,000 mm$^2$/s at 25° C., most preferably of about 100,000 to about 500,000 mm$^2$/s at 25° C., and preferably about 0.1 to about 1.0% by weight, most preferably about 0.2 to about 0.5% by weight, of silicon dioxide having a preferred average particle diameter of about 2 to about 4 μm.

The other sealing layer preferably comprises about 0.1 to about 1.0% by weight, most preferably about 0.2 to about 0.5% by weight, based on the weight of the layer, of silicon dioxide having a preferred average particle diameter of about 2 to about 4 μm. This layer is preferably corona-treated and preferably does not comprise polydialkylsiloxane mixed therewith. However, this layer preferably has polydialkysiloxane as a layer or coating on its outer surface. This polydiorganosiloxane layer is preferably formed by said polydialkylsiloxane being transferred when the two sealing layers come into contact. The relative polydialkylsiloxane coating on the corona-treated outer surface is preferably at most about 18, most preferably about 2 to about 12, determined with the aid of ESCA spectroscopy (ESCA=Electron Spectroscopy for Chemical Analysis). Common ESCA-spectroscopy is a means for analyzing the upper most layer of the surface of a substrate. Said upper most layer is irradiated, whereby the silicon and carbon atoms are ionized. This ionization causes emission of a characteristic wavelength of the Si- and C-atoms with an intensity depending on the amount of silicon and carbon on the surface.

The relation of both intensities provides a measure without dimension for the polydialkylsiloxane coating on the surface.

The corona-treated sealing layer preferably has a surface tension of greater than about 36 mN/m and less than about 40 mN/m immediately after its production.

The thickness of each of the sealing layers is preferably greater than about 0.5 μm, most preferably of about 0.7 to about 1.0 μm.

The base layer is comprised of a peroxide-degraded propylene polymer which is predominantly comprised of propylene and preferably has a melting point in the range of about 162 to about 168° C. Isotactic polypropylene having a n-heptane-soluble fraction of 6% or less by weight and comprising at least 90% or more by weight of polypropylene is a preferred propylene polymer. In order to achieve the required good optical characteristics, the peroxide-degraded polypropylene homopolymer preferably has a degradation factor A of about 3 to about 10, most preferably of about 4 to about 8. The melt index of the polypropylene starting powder is preferably less than about 1.5 g/10 min, most preferably about 0.2 to about 0.9 g/10 min as measured in accordance with DIN 53 735, 21.6 N load and 230° C. The polypropylene starting powder is preferably degraded by adding organic peroxides, for example, dialkyl peroxides such as 2,5-dimethyl-2,5-di(t-butylperoxy)hexane or di-t-butyl peroxide, during extrusion until a preferred granule melt index of about 2 to about 5.5 g/10 min as measured in accordance with DIN 53 735, 21.6 N load and 230° C. is reached. The degradation factor A of the polypropylene homopolymer is defined as $$A = \frac{S_{G(PP)}}{S_{F(PP)}}$$

where $S_{G(PP)}$=melt index of the degraded PP granules (PP=polypropylene) and $S_{F(PP)}$=melt index of the PP starting powder, each being measured in accordance with DIN 53 735 at 21.6 N load and 230° C.

If the degradation factor of the polypropylene homopolymer is below about 3, the optical characteristics are impaired, i.e., there is a distinct increase in film turbidity and reduction in surface gloss. If the degradation factor is greater than about 10, problems arise during stretching, which has an extremely adverse effect on the running reliability during film production. At a degradation factor of greater than about 10, the polypropylene homopolymer is stretchable within only a very narrow temperature range, or is no longer stretchable at all.

Peroxide degradation and peroxide-degraded or CR ("controlled rheology") polypropylene homopolymers as such, are disclosed in the literature (cf. Plastverarbeiter, Volume 38, 1985. No. 4; Polymer Engineering and Science, March 1989, Vol. 29, No. 6; Plastverarbeiter, Volume 36, 1985, No. 11). Peroxide-degraded polypropylene homopolymers of this type are used in particular in injection molding technology and fiber production. Peroxide-degraded $C_2/C_3$ copolymers having a $C_2$ content of 1 to 2.5% by weight are in some cases also used for non-stretched office films (organizational sector). However, the size of the degradation factor in the case of these products is not described.

The olefin resin composition of the sealable layers contained in the multilayer films preferably has a p-xylene-soluble fraction at 20° C. of about 25 to about 70% by weight, most preferably of about 40 to about 60% by weight. The melting point of the olefin resin composition is preferably 120° C. or above. The olefin resin composition preferably has a melt flow index of about 1 to about 16 g/10 min at 230° C. and 21.6 N load (DIN 53 735), most preferably of about 4 to about 10 g/10 min at 230° C. and 2.16 kp load.

The copolymer comprised of α-olefins which is marketed by Mitsui Petrochemical Industries Ltd. under the name Tafmer XR-107 L ® has proven particularly useful.

The following are examples of suitable polydiorganosiloxanes useful in the layers as set forth above: polydialkylsiloxanes, olefin-modified siloxane oils, polyether-modified silicone oils, olefin/polyether-modified silicone oils, epoxy-modified silicone oils, alcohol-modified silicone oils, and polydialkylsiloxanes having preferably 1-4 carbon atoms in the alkyl group, in particular polydimethylsiloxanes.

The polydiorganosiloxane content in the non-corona treated layer is preferably not less than about 0.8% by weight, based on the sealable layer, since amounts of less than about 0.8% leads to an increased rejection rate at the fast-running packaging machines. Amounts of polydiorganosiloxane of greater than about 3.0% by weight, based on the sealable layer, lead to processing difficulties in film production and to misfeeding in the packaging machines because of inadequate friction. Accordingly, the amount of polydiorganosiloxane is preferably about 0.8% to about 3% by weight of the non-corona treated layer.

If the viscosity of the polydialkylsiloxane employed is less than about 100,000, in particular less than about 50,000 mm$^2$/s at 25° C., the multilayer film shows troublesome flow defects over the film width. For instance, the films have flow defects when the sealing layer preferably contains about 2.4% by weight of polydimethylsiloxane having a viscosity of 30,000 mm$^2$/s at 25° C. However, the film does not have flow defects when the sealing layer contains about 2.4% by weight of polydimethylsiloxane having a viscosity of 300,000 mm$^2$/s at 25° C.

Experiments showed that a polydimethylsiloxane having a viscosity of about 300,000 to about 500,000 mm$^2$/s at 25° C. is very particularly suitable.

According to a preferred process of the invention, the highly viscous polydialkylsiloxane is added in the form of a masterbatch during the film production.

In a most preferred method, the highly viscous polydialkylsiloxane is admixed in the form of a masterbatch, with the base material being an olefin resin composition comprising an ethylene/propylene/butylene terpolymer and a propylene/butylene copolymer, with the other components of the film.

Within the framework of the present invention, the term masterbatch is to be understood as a stock mixture, in particular, a granular, dust-free concentrate of a plastic raw material containing large amounts of active component, which is used as an intermediate in the preparation of the mass and thus as an additive to granules which do not contain active component, prior to extrusion, in order to produce therefrom moldings containing specific amounts of active component. The characteristic features of the masterbatch employed according to the invention are that it preferably contains between about 6 and about 18% by weight, based on the total weight of polymer plus active components, of active component and that it is in the form of cylindrical or lens-shaped granules.

The active components are the polydiorganosiloxane described above. A polydimethylsiloxane having a viscosity of more than 50,000 mm$^2$/s at 25° C., in particular of 100,000 to 500,000 mm$^2$/s at 25° C., is a particularly preferred active component. The masterbatch can also additionally contain appropriate additives, such as antiblocking agents, antioxidants, antistatic agents and/or stabilizers, in an effective amount.

If the masterbatch is in the form of cylindrical granules, the average diameters of the cylinders are preferably in the range of about 1 to about 2 mm and the average length of the cylinders is in the range of about 0.5 to about 1.5 mm. If the masterbatch is in the form of lens-shaped granules, the lenses preferably have an average diameter in the range of about 1 to about 3 mm and an average thickness in the range of about 0.5 to 1 mm.

The preferred polymer used as a stock material is the olefin resin composition, comprising an ethylene/propylene/butylene terpolymer and a propylene/butylene copolymer, described above as a sealable layer.

In accordance with the process of the invention, the masterbatch is admixed, before the polymer granules are filled into the extruder, with the granules composed of polymer which does not contain any active component, in an amount such that the desired percentage by weight of active component is achieved in the sealable layer.

The masterbatch in the form of cylindrical granules preferably has a bulk density of more than about 570 kg/m$^3$, most preferably of about 600 to about 800 kg/m$^3$. The increased bulk density is achieved by means of the heavy, but very small, grains.

Surprisingly, two further very favorable effects are achieved by the use of the described masterbatch technique, which effects lead to a substantial improvement in the economy and in the film quality of the films produced using said masterbatch technique.

Specifically, by using the masterbatch, an increase in the extruder output was achieved, said increase corresponding approximately to the degree of increase in density.

According to measurements on grooved feed zones, which provide effective conveying, (see Kunststoffe 72 (1982) 5, 262–266), the mass throughput m, to be calculated by use of equation (1) below, for a given geometry from screw diameter D and speed of rotation n is then dependent only on the bulk density $$\rho_s \; [\dot{m} = K \cdot \rho_s \cdot n \cdot D^3] \qquad (1)$$

In the equation, K is a constant in which, inter alia, the friction coefficients of the polymers on the cylinder and on the screw are incorporated. If it is assumed that, as a result of the addition of the masterbatch, the ratio of the friction coefficients of the polymers at screw and cylinder are virtually constant relative to one another, the mass throughput $\dot{m}^{MB}$ resulting when the masterbatch is used is given directly by $$\dot{m}^{MB} = \frac{\rho_s^{MB}}{\rho_s} \cdot \dot{m} \qquad (2)$$

$\rho_s MB$ = bulk density with masterbatch
$\rho_s$ = bulk density without masterbatch If, for example, m is about 100 kg/h, then, using the numerical values for $\rho_s$ and $\rho_s MB$, the throughput when the masterbatch is used is $$\dot{m}^{MB} = \frac{730}{570} \cdot 100 = 128 \text{ kg/h}.$$

The second favorable effect to be seen is a dramatic reduction in the pressure fluctuations at the outlet of the extruder. For example, if pressure fluctuation values at the outlet of the extruder of 10 to 15 bar were measured when using an olefin resin composition provided with highly viscous polydialkylsiloxane by drum application of the slip agent or incorporation of the slip agent, these values are at most only 3 bar when the masterbatch process according to the invention is used. As a result of the use of the masterbatch according to the invention, it is possible, surprisingly, to produce films having more uniform film characteristics, in particular having more homogeneous film optical characteristics, i.e., no flow defects, and having a better thickness uniformity of the sealing layer, which signifies an improved process reliability and a further improvement in processability of the film.

The corona treatment of the corona-treated layer is carried out before the polydialkylsiloxane coating is applied and as a result of this the film according to the invention is printable on said layer and, at the same time, also has all of the other above-mentioned important characteristics. According to the invention it is thus possible in a simple manner, such as by bringing a sealing layer incorporating polydialkylsiloxane into contact with the outer surface of the other of the two sealing layers not containing polydialkylsiloxane, to combine corona treatment and the presence of polydialkylsiloxane in a single sealing layer and to achieve the effects desired by this means such as good printability, good slip properties, low sealing initiation temperature, and good sealability without having to accept any adverse effects in further important characteristics.

The amount of highly viscous polydialkylsiloxane which is transferred to the outer surface of the corona-treated sealing layer represents only a fraction of the highly viscous polydialkylsiloxane incorporated in the other sealing layer. Accordingly, an amount of highly viscous polydialkylsiloxane of about 1.0 to about 4.0% by weight, preferably about 1.5 to about 3.0% by weight based on the total weight of the layer, added to the olefin resin composition of the other sealing layer is not substantially reduced as a result of said transfer.

If the value for the relative coating of the corona-treated outer surface which is measured with the aid of ESCA spectroscopy is more than 18, the amount of polydialkylsiloxane present is already so large that processing problems could result when the film is used. On the other hand, in the case of very small values the sliding properties of the film can be impaired. Accordingly, the relative polydialkylsiloxane coating is preferably about 2 to about 12.

The coating of the corona-treated layer with polydialkylsiloxane is effected by any known process, preferably by bringing the two sealing layers into contact. Contact between the sealing layers is produced, for example, if, after its production, the film is wound at the temperature prevailing at that time, generally at approximately room temperature, because the two sealing layers then come into close mutual contact with one another. The intended transfer is also promoted by the fact that the two sealing layers are in contact under the pressure produced by winding. It has been found that the polydialkylsiloxane transfer takes place and the required coating is present after only a brief contact time.

The corona-treated sealing layer preferably has a surface tension of more than about 36 mN/m and less than about 40 mN/m immediately after production. This pretreatment intensity should appropriately be maintained within these narrow limits. If the surface tension is less than about 36 mN/m, the printability of the film is poor. Moreover, the long-term printability and long-term coatability characteristics are extremely unfavorable. If the corona-treated layer has a surface tension of greater than or equal to about 40 mN/m immediately after production, the sealing initiation temperature rises by about 10° C. In addition, the strength of the sealing seam is considerably reduced.

If the thickness of the sealing layer is less than about 0.7 $\mu$m, in particular less than about 0.5 $\mu$m, there is impairment, in turn, of the sealing characteristics, i.e., rise in the sealing initiation temperature and lowering of the strength of the sealing seam, and the corona treatability. Moreover, the long-term characteristics of the pretreatment intensity are unfavorable. In the case of layer thicknesses of more than 2 $\mu$m, there is impairment of the optical characteristics of the film, i.e., increased turbidity, and impairment of the processing characteristics on high-speed packaging machines. Good sealing characteristics such as low sealing initiation temperature and high sealing seam strength, good corona treatability, favorable long-term characteristics in respect to printability and coatability in combination with a low degree of film turbidity and favorable processing characteristics are achieved if the thickness of each of the sealing layers is preferably about 0.7 to about 1.0 $\mu$m.

In order to further improve specific characteristics of the polyolefin film according to the invention, both the base layer and the two sealing layers can contain customary additives, in an effective amount, preferably antistatic agents, stabilizers, slip agents, and/or hydrocarbon resins of low molecular weight which are compatible with the polymer of the base layer and the sealing layers.

Preferred antistatic agents include alkali metal alkanesulfonates, polyether-modified, i.e., ethoxylated and/or propoxylated, polydiorganosiloxanes such as polydialkylsiloxanes, polyalkylphenylsiloxanes and the like; and/or the essentially straight-chain and saturated aliphatic tertiary amines containing an aliphatic radical having 10 to 20 carbon atoms, which are substituted by $\omega$-hydroxy($C_1$–$C_4$)alkyl groups, amongst which N,N′-bis(2-hydroxyethyl)alkylamines containing ($C_{10}$–$C_{20}$)-, preferably ($C_{12}$–$C_{18}$)alkyl groups are particularly suitable. The effective amount of antistatic agent is generally in the range of about 0.05 to about 3% by weight, based on the layer. Wherein, when polyether-modified polysiloxane is used, it is added only to the polymer for the base layer and/or to the polymer of the sealing layers which is intended to incorporate polydialkylsiloxane, i.e., the layer which is not corona-treated.

The stabilizers used can be the customary compounds having a stabilizing effect on ethylene polymers, propylene polymers, and other $\alpha$-olefin polymers. The effective amount is in general about 0.1 to about 2% by weight, based on the layer.

The preferred resin of low molecular weight is a naturally occurring or synthetic resin having a softening point of about 60 to about 180° C., preferably about 80 to about 150° C. (determined in accordance with ASTM E-28). Amongst the numerous resins of low molecular weight, the hydrocarbon resins are preferred, specifically petroleum resins, styrene resins, cyclopentadiene resins, and terpene resins. These resins are described in Ullmanns Enzyklopädie der Techn. Chemie (Ullmanns Encyclopedia of Industrial Chemistry), 4th edition, Volume 2, pages 539 to 553. The effective amount of resin of low molecular weight is generally about 3 to about 15% by weight, preferably about 5 to about 10% by weight, based on the layer.

The thickness of the polyolefin multilayer film according to the invention can vary within wide limits and depends in particular on the intended use. Its total thickness is preferably about 10 to about 50 $\mu$m, most preferably about 20 to 40 $\mu$m, the sealing layers are each preferably thicker than about 0.5 $\mu$m and most preferably about 0.7 to about 1.0 $\mu$m thick. The thickness of the base layer preferably makes up about 50 to about 90% of the total film thickness.

The multilayer film according to the invention can be produced by any known process. Furthermore, the top layers can be of identical or different composition. A preferred process is the known co-extrusion process. Within the framework of this process, the procedure is such that the melts corresponding to the individual layers of the film are co-extruded through a sheet die, the film thus obtained is cooled in order to solidify it, the film is biaxially stretched to orient it and the biaxially stretched film is heat-set and corona-treated on the surface layer intended for corona treatment. The biaxial stretching (orienting) can be carried out simultaneously or successively. Successive biaxial stretching, in which first longitudinal stretching (in the machine direction) and then transverse stretching (vertically to the machine direction) is carried out is preferred.

Thus, initially, as in the case of the conventional co-extrusion process, the polymer or the polymer mixture of the individual layers is compressed and liquefied in an extruder. The melts are then simultaneously pressed through a sheet die and the multilayer film pressed out is cooled and solidified on one or more rollers, which are preferably kept at about 30 to about 50° C., by means of cooling. The film thus obtained is then stretched longitudinally and transversely to the extrusion direction, which leads to an orientation of the molecule chains. The stretching ratio in the longitudinal direction is preferably about 4:1 to about 7:1 and in the transverse direction is preferably about 8:1 to about 10:1. The longitudinal stretching is preferably carried out at a film temperature of about 120° to about 140° C. and the transverse stretching preferably at about 160° to about 175° C. The longitudinal stretching will appropriately be carried out with the aid of two rollers operating at different speeds depending on the desired stretching ratio and transverse stretching with the aid of an appropriate clip frame. The biaxial stretching of the film is followed by its heat-setting (heat treatment). For this treatment, the film is preferably kept at a temperature of about 150° to about 160° C. for about 0.5 to about 10 s.

The corona treatment is preferably carried out using an alternating voltage of about 10,000 V and 10,000 Hz. The film produced in this way is wound in the customary manner with the aid of a winding installation and immediately after production has a surface tension on the treated side of preferably more than about 36 mN/m and less than about 40 mN/m.

The polyolefin multilayer film according to the invention is particularly suitable as packaging film on high-speed wrapping machines of various types. It possesses all of the important characteristics which are demanded of polyolefin films with regard to high-speed machines. It has, in particular, a low seal initiation temperature on both sides and high seal seam strengths, in combination with a low degree of film turbidity, a high surface gloss, homogeneous film optical characteristics, i.e., no flow defects, low sensitivity to scratching, good frictional characteristics, good corona treatability, good printability, favorable long term characteristics in respect of printability and coatability and good processing characteristics (machinability). The film is also suitable for the production of laminates with paper, cardboard, metallized plastic films and plastic films.

The invention is illustrated in more detail by the following examples:

EXAMPLE 1

By use of the co-extrusion process, a triple-layer film having a total thickness of 1 mm is extruded from a sheet die at an extrusion temperature of 260° C., the base layer of said film comprising, as main component, a peroxide-degraded isotactic polypropylene homopolymer containing a n-heptane-soluble fraction of 4.5% by weight and having a melting point of 165° C.

The polypropylene polymer was degraded from a polypropylene starting powder having a melt index $S_{F(PP)}$ of 0.7 g/10 min (determined in accordance with DIN 53 735 at 21.6 N load and 230° C.) by adding di-t-butyl peroxide until a granule melt index $S_{G(PP)}$ of 3.5 g/10 min (DIN 53 735 at 21.6 N load and 230° C.) had been reached, from which a degradation factor A of 5 results.

The base layer is surrounded by the various sealing layers, i.e., the triple-layer film has an A-B-C structure, wherein A and C are sealing layers, and B is the base layer).

All layers contain 0.12% by weight of pentaerythrityl tetrakis-4-(3,5-di-tert-butyl-4-hydroxyphenyl)propionate (Irganox 1010 ®) for stabilization and also 0.06% by weight of calcium stearate in order to neutralize acid catalyst residues. The base layer also contains 0.15% by weight of N,N'-bis-(2-hydroxyethyl)-($C_{10}$–$C_{20}$)alkylamine (Armostat 300 ®) as an antistatic agent.

One sealing layer (A layer) comprises 97.4% by weight of an olefin resin composition which is comprised of a₁) 50% by weight of an ethylene/propylene/butylene terpolymer comprising 1.4% by weight of ethylene, 2.8% by weight of butylene and 95.8% by weight of propylene (in each case based on the terpolymer) and a₂) 50% by weight of a propylene/butylene copolymer, comprising 66.8% by weight of propylene and 33.2% by weight of butylene (in each case based on the copolymer) (a₁+a₂ is TAFMER XR-107 L ®). The a₁)+a₂) mixtures comprise 0.7% by weight of ethylene, 81.3% by weight of propylene and 18% by weight of butylene, based on TAFMER XR-107 L ®. The olefin composition a₁+a₂ had a melt flow index of 8 g/10 min and a melting point of 150° C.

b) 0.2% by weight, based on the sealing layer, of silicon dioxide having an average particle diameter of 4.0 μm.

c) 2.4% by weight, based on the sealing layer, of polydimethylsiloxane having a kinematic viscosity of 500,000 mm²/s at 25° C.

The highly viscous polydimethylsiloxane is added to the above-mentioned olefin resin composition via a masterbatch before extruding. The masterbatch comprises 12% by weight of the highly viscous polydimethylsiloxane and 88% by weight of the olefin resin composition (Tafmer XR 107 L ®), i.e. the masterbatch is metered in a concentration of 20% by weight.

This sealing layer (A layer) is thus formed from 97.4% by weight of the said polymer mixture (Tafmer XR 107 L ®), 0.2% by weight of the said silicon dioxide and 2.4% by weight of the said siloxane.

The other sealing layer (C layer), which is subsequently corona-treated, is comprised of the same polymer mixture (Tafmer XR 107 L ®) and does not contain any polysiloxane, and incorporates 0.2% by weight, based on the sealing layer, of silicon dioxide having an average particle diameter of 4.0 μm.

The triple-layer film is quenched on a cooling roller at 30° C. The film is then transferred from the cooling roller to a triple roller, likewise at 30° C., and, after heating to 130° C., is longitudinally stretched by a factor of 5 by a further triple roller. It is then stretched 10-fold in the transverse direction at an air temperature of 175° C. The corona treatment of the C layer (sealing layer which does not incorporate any polysiloxane) is then carried out using an alternating voltage of about 10,000 volt and 10,000 Hz. The film produced in this way is wound using a winding installation and immediately after production has a surface tension of 38-39 mN/m on the treated side (C layer).

The multilayer film formed in this way has an approximately 19 μm thick base layer composed of peroxide-degraded polypropylene and a 0.8-0.9 μm thick sealing layer on each side.

EXAMPLE 2

Example 1 is repeated. The (isotactic) propylene homopolymer of the base layer was, however, degraded from a polypropylene starting powder having a melt index $S_{P(PP)}$ of 0.5 g/10 min (determined in accordance with DIN 53 735 at 21.6 N load and 230° C.) by adding di-t-butyl peroxide until a granule melt index $S_{G(PP)}$ of 3.5 g/10 min (DIN 53 735 at 21.6 N load and 230° C.) has been reached, from which a degradation factor A of 7 results.

EXAMPLE 3

Example 1 is repeated. The sealing layer which is not corona-treated (A layer) is comprised of 98.6% by weight of the olefin resin composition described in Example 1 (Tafmer XR 107 L ®), 0.2% by weight, based on the sealing layer, of silicon dioxide having an average particle diameter of 4.0 μm and 1.6% by weight, based on the sealing layer, of polydimethylsiloxane having a kinematic viscosity of 500,000 mm²/s at 25° C. The highly viscous polysiloxane is added, as indicated in Example 1, via a masterbatch which is composed of 12% by weight of the highly viscous polysiloxane and of 88% by weight of the olefin resin composition described (Tafmer XR 107 L ®).

EXAMPLE 4

Example 3 is repeated. The highly viscous polydimethylsiloxane is, however, added via a masterbatch which is composed of 8% by weight of polysiloxane having a kinematic viscosity of 500,000 mm²/s at 25° C. and 92% by weight of the said polymer mixture (Tafmer XR 107 L ®).

Example is repeated. The polydimethylsiloxane which is added as slip agent to the sealing layer (A layer) which is not corona-treated has a kinematic viscosity of 300,000 mm²/s at 25° C.

COMPARATIVE EXAMPLE 1

Example 1 is repeated. The isotactic propylene homopolymer likewise has a granule melt index of 3.5 g/10 min (DIN 53 735 at 21.6 N load and 230° C.). However, the polypropylene polymer of the base layer is *not* degraded.

COMPARATIVE EXAMPLE 2

Example 1 is repeated. The polydimethylsiloxane which is added as slip agent to the sealing layer (A layer) which is not corona-treated has a kinematic viscosity of 30,000 mm²/s at 25° C.

COMPARATIVE EXAMPLE 3

Example 1 is repeated. Immediately after production, the triple-layer film produced has a surface tension on the treated side, i.e., on the sealing layer which does not incorporate any polysiloxane (C layer), of 41-42 mN/m (adjusted by varying (increasing) the corona treatment intensity).

COMPARATIVE EXAMPLE 4

Example 1 is repeated. The triple-layer film formed has sealing layers which each have a thickness of 0.4-0.5 μm.

COMPARATIVE EXAMPLE 5

A triple-layer film is produced in accordance with Example 1 of European Patent 114,312. The sealing layers (A and C layer) comprise
a) 79% by weight, based on the sealing layer, of an olefin resin composition which is comprised of
   a₁) 50% by weight of an ethylene/propylene/butylene terpolymer comprising 1.4% by weight of ethylene, 2.8% by weight of butylene and 95.8% by weight of propylene (in each case based on the terpolymer) and
   a₂) 50% by weight of a propylene/butylene copolymer comprising 66.8% by weight of propylene and 33.2% by weight of butylene (in each case based on the copolymer),
which corresponds to a content of 0.7% by weight of ethylene, 81.3% by weight of propylene and 18% by weight of butylene, based on the olefin resin composition. The olefin composition a₁+a₂ has a melt flow index of 8 g/10 min and a melting point of 150° C.;
b) 10% by weight, based on the sealing layer, of a hydrogenated hydrocarbon resin having a softening point of 125° C.;
c) 10% by weight, based on the sealing layer, of a propylene homopolymer having a melting point of 126° C.; and
d) 1% by weight, based on the sealing layer, of polydimethylsiloxane having a kinematic viscosity of 30,000 mm²/s at 25° C.

COMPARATIVE EXAMPLE 6

Example 1 is repeated, but the sealing layers are composed of a random ethylene/propylene copolymer containing 4.5% by weight of ethylene without further additives (comparison with DE-OS 16 94 694).

COMPARATIVE EXAMPLE 7

Example 1 is repeated, but the raw material according to Example 2 of European Patent 27,586 is used for the sealing layers.

COMPARATIVE EXAMPLE 8

Example 1 is repeated. The isotactic propylene homopolymer likewise has a granule melt index of 3.5 g/10 min (DIN 53 735 at 21.6 N load and 230° C.). The polypropylene polymer of the base layer is, however, not peroxide-degraded.

The sealing layers are comprised only of the olefin resin composition described in Example 1 (Tafmer XR 107 L ®). This mixture corresponds to a content of 0.7% by weight of ethylene, 81.3% by weight of propylene and 18% by weight of butylene, based on the sealing layer.

Characterization of the Raw Materials

The following measurement methods were used to characterize the raw materials and films:

Softening point

ASTM E 28

Melting point

DSC measurement, maximum of the melting curve, heating rate 20° C./min.

Determination of the Low-Pressure Seal Seam Strength

Two 15 mm wide film strips are placed on top of one another and sealed at 110° C. using a sealing time of 0.5 s and a sealing pressure of 1.5 N/cm² (apparatus: Brugger, type NDS, seal jaws heated on one side). The seal seam strength is determined by the T-peel method.

Determination of the Seal Initiation Temperature

Using the Brugger HSG/ET sealing apparatus, hot-sealed samples (seal seam 20 mm × 100 mm) are produced by sealing a film at various temperatures with the aid of two heated seal jaws under a sealing pressure of 15 N/cm² and using a sealing time of 0.5 s. Test strips 15 mm wide are cut from the sealed samples. The T-seal seam strength, i.e., the force necessary to separate the test strips, is determined using a tensile testing machine at a pulling speed of 200 mm/min, the seal seam plane forming a right angle with the direction of pull.

The seal initiation temperature (or minimum sealing temperature) is the temperature at which a seal seam strength of 0.5 N/15 mm is achieved.

Passage Through the Machine

The determination of the passage through the machine (running reliability) on the vertical molding/filling/sealing machine (VMFS), the horizontal molding-/filling/sealing machine (HMFS) and the wrapping machine was carried out visually and was rated as follows:

| | |
|---|---|
| very good (++) | <2% of the sample packs are defectively wrapped |
| good (+) | 2-6% of the sample packs are defectively wrapped |
| moderate (+−) | 6-12% of the sample packs are defectively wrapped |
| poor (−) | 12% and more of the sample packs are defectively wrapped |

Determination of the Corona Treatment Intensity

The corona treatment was carried out in such a way that the treated film surface in each case had a treatment intensity of 38-39 mN/m immediately after the treatment. Comparative Example 3 is an exception. In the case of this film sample, the corona treatment was carried out in such a way that the surface tension of the treated sealing layer was 41-42 mN/m immediately after production. The treatment intensity is determined using the so-called ink method (DIN 53 364).

Determination of the Printability

The corona-treated films were printed 14 days after their production (short-term assessment) and 6 months after their production (long-term assessment). The color adhesion was assessed by means of the adhesive tape test. The ink adhesion was assessed as good if no ink could be removed by means of adhesive tape and as poor in the case of clear removal of ink.

Melt Flow Index

DIN 53 735 at 230° C. and 21.6 N load

Turbidity

The turbidity of the film was measured using a method based on ASTM-D 1003-52, a 1° slit diaphragm being used in place of a 4° pin diaphragm and the turbidity being indicated in percent for four layers of film placed on top of one another. The four layers were chosen since this utilized the optimum measurement range. The turbidity assessment was made as follows:

| | |
|---|---|
| ≤17% = | very good (++) |
| ≧17% to 20% = | good (+) |
| ≧20% to 25% = | moderate (±) |
| ≧25% = | poor (−) |

Gloss

The gloss is determined in accordance with DIN 67 530. The reflector value is measured as an optical characteristic for the surface of a film. Using a method based on the standards ASTM-D 523-78 and ISO 2813, the incident angle was set to 20°. A light ray impinges at the set incident angle on the plane test surface and is reflected or scattered by the latter. The light rays impinging on the photoelectric receiver are indicated as a proportional electrical quantity. The measured value is dimensionless and must be indicated with the incident angle. The gloss assessment (incident angle 20°) is made as follows:

| | |
|---|---|
| ≧115 = | very good (++) |
| ≦115 to 110 = | good (+) |
| ≦110 to 100 = | moderate (±) |
| ≦100 = | poor (−) |

Scratch Resistance or Susceptibility to Scratching

The scratch resistance is determined by a method based on DIN 53 754. The abrasion measuring equipment Taber model 503 Abraser from Teledyne Taber is used to determine the scratch resistance, Calibrade R H18 friction wheels, which are subjected to a load of 250 g, being employed. Scratch resistance or sensitivity to scratching is understood to be the increase in turbidity of the scratched film compared with the original film after 50 revolutions of the sample disc. The scratch resistance is designated as very good (++) if the increase in turbidity is less than 22%, as good (+) if the increase in turbidity is 22 to 25%, as moderate (±) if the increase in turbidity is 25–30% and as poor (−) if the increase in turbidity is greater than 30%.

The characteristics of the triple-layer polyolefin films of the examples and comparative examples are summarized in Table 1 below.

The superiority of the films according to the invention in accordance with Example 1 to Example 5 can clearly be seen from the table. Although Comparative Examples 1 to 8 in each case show good characteristics in respect of individual points, none of the multilayer films according to Comparative Examples 1 to 8 is able simultaneously to comply with all requirements, i.e., a low degree of film turbidity, high surface gloss, homogeneous film optical properties, good scratch resistance, low seal initiation temperature on both sides, high seal seam strength on both sides, good printability and run well (smooth passage through the machine) on high-speed packaging machines of various types (VMFS, HMFS and wrapping machine). Only the polyolefin multilayer films according to the invention from Examples 1 to 5 comply with all requirements at the same time.

TABLE 1

| | Turbidity single layer [%] | Gloss Measurement angle 20° | | Film optical character (visual assessment) | Scratch resistance [%] | | Seal initiation temper. (15 N/cm¹, 0.5 s. 110° C.) [°C.] | |
|---|---|---|---|---|---|---|---|---|
| | | A side | C side | | A side | C side | A side | C side |
| Ex. 1 | ++ | ++ | ++ | homogenous | ++ | ++ | 88 | 102 |
| Ex. 2 | ++ | ++ | ++ | homogenous | ++ | ++ | 88 | 102 |
| Ex. 3 | ++ | ++ | ++ | homogenous | ++ | ++ | 88 | 103 |
| Ex. 4 | ++ | ++ | ++ | homogenous | ++ | ++ | 88 | 102 |
| Ex. 5 | ++ | ++ | ++ | homogenous | ++ | ++ | 88 | 103 |
| C Ex. 1 | +/− | +/− | +/− | homogenous | ++ | ++ | 88 | 103 |
| C Ex. 2 | +/− | +/− | +/− | flow defects | ++ | ++ | 89 | 104 |
| C Ex. 3 | ++ | ++ | ++ | homogenous | ++ | ++ | 88 | 120 |
| C Ex. 4 | ++ | ++ | ++ | homogenous | +/− | +/− | 92 | 118 |
| C Ex. 5 | − | − | − | flow defects | +/− | +/− | 94 | >130 |
| C Ex. 6 | +/− | +/− | +/− | homogenous | − | − | 122 | 124 |
| C Ex. 7 | − | − | − | flow defects | +/− | +/− | 120 | >130 |
| C Ex. 8 | +/− | +/− | +/− | homogenous | − | − | 87 | 101 |

| | Seal seam strength (1.5 N/cm², 0.5 s. 110°) (N/15 mm) | | | Machinability (visual assessment) | | |
|---|---|---|---|---|---|---|
| | A/A side | C/C side | Printability | VMFS machine | HMFS machine | wrapping machine |
| Ex. 1 | 2.6 | 1.5 | ++ | ++ | ++ | ++ |
| Ex. 2 | 2.6 | 1.5 | ++ | ++ | ++ | ++ |
| Ex. 3 | 2.7 | 1.6 | ++ | ++ | ++ | ++ |
| Ex. 4 | 2.7 | 1.6 | ++ | ++ | ++ | ++ |
| Ex. 5 | 2.6 | 1.4 | ++ | ++ | ++ | ++ |
| C Ex. 1 | 2.6 | 1.4 | ++ | ++ | ++ | ++ |
| C Ex. 2 | 2.4 | 1.3 | + | + | + | + |
| C Ex. 3 | 2.5 | 0.3 | ++ | ++ | ++ | ++ |
| C Ex. 4 | 2.0 | 0.4 | +/− | +/− | +/− | +/− |
| C Ex. 5 | 1.8 | 0 | + | + | + | + |
| C Ex. 6 | 0 | 0 | ++ | − | − | − |
| C Ex. 7 | 0 | 0 | +/− | +/− | +/− | +/− |
| C Ex. 8 | 2.7 | 1.6 | ++ | − | − | − |

Ex.: Example
C Ex.: Comparative Example
VMFS: Vertical molding/filling/seal
HMFS: Horizontal molding/filling/seal

What is claimed is:

1. A printable, biaxially oriented multilayer film which is low temperature sealing on both sides comprising:
   a) a base layer comprising a peroxide-degraded propylene homopolymer, and
   b) at least one outer sealing layer on each side of the base layer, each sealing layer comprising a mixture of a first polymer being an ethylene/propylene/butylene terpolymer and a second polymer, different from said first polymer, being a propylene/butylene copolymer, at least one of said sealing layers is not corona-treated and comprises a polydiorganosiloxane and silicon dioxide particles.

2. A multilayer film as claimed in claim 1, wherein the peroxide degradation factor of the base layer is in the range of about 3 to about 10.

3. A multilayer film as claimed in claim 1, wherein each sealing layer comprises about 0.1 to about 7% by weight of ethylene, about 53 to about 89.9% by weight of propylene and about 10 to about 40% by weight of butylene, based on the total weight of said copolymer and said terpolymer.

4. A multilayer film as claimed in claim 1, wherein said outer sealing layer which is not corona-treated comprises about 1.0 to about 4.0% by weight of said polydiorganosiloxane, based on the weight of the layer.

5. A multilayer film as claimed in claim 4, wherein said polydiorganosiloxane has a viscosity of more than about 50,000 mm²/s at 25° C.

6. A multilayer film as claimed in claim 1, wherein said outer sealing layer which is not corona-treated comprising about 0.1 to about 1.0% by weight of said silicon dioxide particles, based on the weight of the layer.

7. A multilayer film as claimed in claim 6, wherein said silicon dioxide particles having an average particle diameter of about 2 to about 4 μm.

8. A multilayer film as claimed in claim 1, wherein said polydiorganolsiloxane is mixed with the other components of the layer using a masterbatching technique in which the masterbatch comprises a mixture of said copolymer and said terpolymer as base material and said polydiorganosiloxane as active material.

9. A multilayer film as claimed in claim 1, wherein the sealing layer other than the non-corona treated layer is corona-treated.

10. A multilayer film as claimed in claim 9, wherein said corona-treated sealing layer comprises silicon dioxide particles.

11. A multilayer film as claimed in claim 10, comprising about 0.1 to about 1.0% by weight of said silicon dioxide particles in said corona-treated layer based on the weight of the layer.

12. A multilayer film as claimed in claim 11, wherein said silicon dioxide particles in said corona-treated layer have a particle diameter of about 2 to about 4 μm.

13. A multilayer film as claimed in claim 9, wherein said corona-treated outer sealing layer comprises a polydiorganosiloxane coating on its outer surface, but does not comprise a polydiorganosiloxane admixed with the components of said corona-treated outer sealing layer.

14. A multilayer film as claimed in claim 13, wherein the relative polydiorganosiloxane coating is at most about 18, as determined by electron spectroscopy.

15. A multilayer film as claimed in claim 9, wherein said corona-treated sealing layer has a surface tension of between about 36 mN/m and about 40 mN/m immediately after production.

16. A multilayer film as claimed in claim 1, wherein the thicknesses of each sealing layer is between about 0.6 μm and about 2.0 μm.

17. A multilayer film as claimed in claim 1, wherein the base layer comprises additives selected from the group consisting of antistatic agents, slip agents, stabilizers, hydrocarbon resins compatible with the polymers of the sealing layer, and mixtures thereof.

18. A multilayer film as claimed in claim 1, wherein said polydiorganosiloxane comprises a polydialkylsiloxane.

19. A multilayer film as claimed in claim 18, wherein the polydialkylsiloxane has 1 to 4 carbon atoms in the alkyl part.

20. A multilayer film as claimed in claim 1, wherein at least one sealing layer comprises an additive selected from the group consisting of antistatic agents, stabilizers, hydrocarbon resins compatible with the polymers of the base layer, and mixture thereof.

21. A packaging film comprising a multilayer film as claimed in claim 1.

22. A laminate which comprises as a layer thereof, a multilayer film as claimed in claim 1.

23. A laminate as claimed in claim 21, further comprising a layer of paper, cardboard, metallized plastic film, or unmetallized plastic film.

24. A multilayer film as claimed in claim 1, which is a three layer film having a base layer and two outer sealing layers, wherein the base layer comprises an isotactic polypropylene homopolymer.

25. A multilayer film as claimed in claim 5, wherein the viscosity is between about 100,000 and about 500,000 mm$^2$/s.

26. A multilayer film as claimed in claim 25, wherein the viscosity is between about 300,000 and about 500,000 mm$^2$/s.

* * * * *